UNITED STATES PATENT OFFICE.

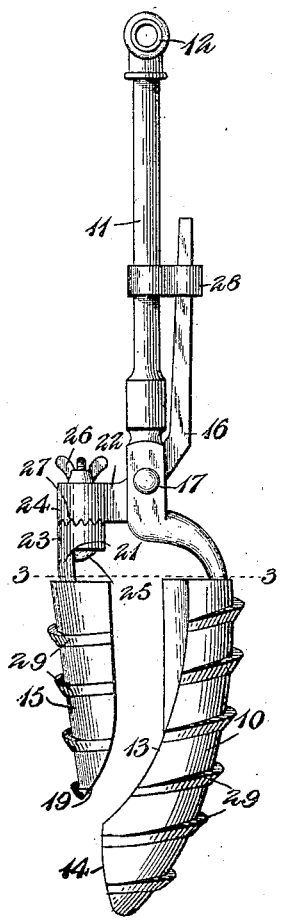

GEORGE FRANK, OF TITONKA, IOWA.

EARTH-AUGER.

No. 838,614.  Specification of Letters Patent.  Patented Dec. 18, 1906.

Application filed September 18, 1906. Serial No. 335,080.

*To all whom it may concern:*

Be it known that I, GEORGE FRANK, a citizen of the United States, residing at Titonka, in the county of Kossuth and State of Iowa, have invented new and useful Improvements in Earth-Augers, of which the following is a specification.

This invention is an earth-auger, and has for its object an improved form of bit, together with an adjustable reamer and other novel features of construction hereinafter described and claimed.

In the accompanying drawings, Figures 1 and 2 are elevations of the invention in different positions. Fig. 3 is a horizontal section on the line 3 3 of Fig. 1.

Referring specifically to the drawings, 10 denotes the auger-bit, which is secured to one end of a shank 11, provided with a suitable operating-handle 12. The bit is an inwardly-curved semicircular blade having on one side a cutting edge 13. The blade tapers to a point at its lower end, and said end is also twisted to form a cutting-lip 14, which is in advance of the cutting edge 13.

The reamer 15 is carried by a shank 16, which crosses and is pivoted at 17 to the shank 11, the latter shank having a slot 18, through which the shank 16 extends. The reamer is a semicircular blade having a curved and sharpened lower end 19, so that it will readily penetrate the ground. The blade also has on one side a cutting edge 20. At its upper end the reamer is secured to a short stem 21, and the lower end of the shank 16 has an extension 22. Said stem and the extension have circular heads 23 and 24, respectively, which are pivotally connected by a bolt 25, extending through alined openings in said heads. The bolt is secured by a wing-nut 26. The contacting faces of the heads have interlocking radially-disposed teeth 27, which prevent the heads from turning on each other when clamped in adjustable position by the bolt 25.

In use when the auger is screwed into the ground the dirt will be packed into the space between the bit and the reamer. The shank 16 is locked to the shank 11 by a sleeve 28, slidable on the latter. When full, the auger will be withdrawn from the hole and emptied by sliding the sleeve 28 off the shank 16, which releases the reamer and permits it to swing away from the bit, thereby allowing the dirt to drop from the auger. If the soil is sticky, the reamer may be removed, as the bit will hold the dirt without it. The reamer can be readily set according to the diameter of the hole to be bored upon loosening the nut 26 and turning the reamer-blade so that its cutting edge extends the required distance beyond the plane of the cutting edge of the bit, as shown by dotted lines in Fig. 3. To assist the advance of the auger into the ground, the outside of the bit and reamer are formed with helical ribs 29.

I claim—

1. An earth-auger comprising crossed and pivotally-connected shanks carrying respectively a bit and an adjustable reamer.

2. An earth-auger having a pair of semicircular blades provided with a cutting edge, one of said blades being adjustable to extend its cutting edge beyond the plane of the cutting edge of the other blade.

3. An earth-auger comprising crossed and pivotally-connected shanks each carrying a semicircular blade having a cutting edge, and one of said blades being adjustable to extend its cutting edge beyond the plane of the cutting edge of the other blade.

In testimony whereof I have signed my name to this specification in the presence of two subscribing witnesses.

GEORGE FRANK.

Witnesses:
 H. C. ARMSTRONG,
 GLEN REIBSAMEN.